UNITED STATES PATENT OFFICE.

EMIL FISCHER, OF BERLIN, GERMANY, ASSIGNOR TO C. F. BOEHRINGER & SOEHNE, OF WALDHOF, GERMANY.

PROCESS OF OBTAINING ALKYL-URIC ACID.

SPECIFICATION forming part of Letters Patent No. 616,656, dated December 27, 1898.

Application filed July 23, 1897. Serial No. 645,673. (No specimens.)

*To all whom it may concern:*

Be it known that I, EMIL FISCHER, a citizen of the Empire of Germany, residing at Berlin, in the Empire of Germany, have invented certain new and useful Improvements in the Art of Preparing the Alkyl Derivatives of Uric Acid; and I do hereby declare the following to be a full, clear, and exact description of the invention, such as will enable others skilled in the art to which it appertains to make and use the same.

The present invention relates to the art of preparing the alkyl derivatives or homologues of uric acid; and it has special reference to the method of preparing those derivatives which are set forth in my application for Letters Patent of the United States, filed October 26, 1896, Serial No. 610,126. In that application I have described and claimed a method of obtaining these derivatives which consists, essentially, in causing a haloid ether, such as methyl iodid, to act on uric acid or its alkyl derivatives together with an alkali, the preferable method being to employ the wet way—that is to say, to cause the haloid ether to act upon an alkaline solution of the uric acid or its alkyl derivative or upon uric acid or its alkyl derivative together with alkali suspended in water. I have found in the course of subsequent experiments that the alkalization of the uric acid proper or its alkyl derivatives (which are all comprised under the generic designation "uric acid") may be effected not only by means of haloid ethers, or, in other words, the esters of the hydrohalogen acids, but that the esters of other acids may be utilized for this purpose. For this purpose I have found the esters of those acids which have been found to possess considerable electrical conductivity (see Ostwald's *Lehrbuch der Allgemeinen Chemie,* 2d vol., 1,650)—such as nitric acid, ethyl-sulfuric acid, isoethionic acid, benzene-sulfonic acid, or sulfuric acid—to be particularly adapted.

To enable those skilled in the art to fully understand and carry into effect my invention, I will give the following examples, which are descriptions of the preparation of methyl-uric acid by the action of methyl nitrate, methyl-benzene-sulfonic-acid ester, and of methyl sulfate of potassium on the alkaline solution of uric acid proper, according to the method set forth in the aforesaid application. The proportions are all given by weight.

Example 1: Two thousand one hundred parts of water are poured over thirty parts of uric acid and the mixture is then dissolved by the addition of two hundred parts of ten per cent. potash lye and then heated to and maintained for three hours at 80° centigrade, together with twenty-four parts of methyl nitrate in a digester, the whole being stirred during the heating operation. The clear solution while yet hot is then mixed with fifty parts of concentrated hydrochloric acid. It is then allowed to cool, and after standing for several hours the crystallized methyl-uric acid is separated by decanting or otherwise removing the mother liquor. By this method there are obtained twenty-nine parts of a methyl-uric acid, which, however, still contains some of the uric acid proper. On removing the latter by the sparingly-soluble acid urate of potassium the purified methyl-uric acid is obtained.

Example 2: Fifty parts of uric acid are dissolved by means of two hundred and seventy parts of ten per cent. potash lye and twelve hundred and fifty parts of water, and then heated in a digester with seventy-seven parts of methyl-benzene-sulfonic-acid ester to 100° centigrade, and maintained at this temperature for three hours, the liquid being constantly agitated. Since the mass on cooling assumes the consistency of a jelly, it is advantageous to add to the still heated mass enough hydrochloric acid to produce acid reaction. It is then allowed to cool. By this method forty-six parts of a methyl-uric acid are obtained, which, however, still contains some of the uric acid proper.

Example 3: Ten parts of uric acid are suspended in sixty parts of hot water and brought into solution by the addition of sixty-six parts of double-normal potash lye and then heated in a digester, together with a concentrated aqueous solution of thirteen parts of methyl sulfate of potassium, to 110° centigrade. The liquid is maintained at this temperature for six hours and constantly agitated. After cooling and adding alcohol the unchanged uric acid proper is separated out as acid urate of potassium. This is removed by filtration. From the filtrate the methyl-uric acid is precipitated in a pure state by hydrochloric acid.

Instead of employing the uric acid proper the alkyl-uric acids may be employed with similar results. The term "uric acid" as employed in the claims comprises not only uric acid proper, but its alkyl derivatives.

What I claim, and desire to secure by Letters Patent, is—

1. The process which consists in acting upon a uric acid together with an alkali with an ester of an acid possessing considerable electrical conductivity such as nitric acid.

2. The process which consists in acting on a uric acid and an alkali in solution with the ester of an acid possessing considerable electrical conductivity such as nitric acid.

3. The process which consists in adding to the solution of uric acid proper with alkali the ester of an acid possessing considerable electrical conductivity, such as nitric acid, and then heating the solution under pressure and while agitating the same.

4. The process which consists in adding to the solution of uric acid proper with alkali the ester of an acid possessing considerable electrical conductivity, such as nitric acid, and then heating the solution under pressure and while agitating the same, then adding to the hot solution hydrochloric acid and then allowing the same to cool.

In testimony whereof I affix my signature in presence of two witnesses.

EMIL FISCHER.

Witnesses:
W. HAUPT,
HENRY HASPER.